(12) United States Patent
Illedits et al.

(10) Patent No.: US 11,021,345 B2
(45) Date of Patent: Jun. 1, 2021

(54) CONVEYANCE ELEMENT FOR A CONVEYOR

(71) Applicant: Otis Elevator Company, Farmington, CT (US)

(72) Inventors: Thomas Illedits, Neufeld an der Leitha (AT); Alexander Turek, Munchendorf (AT)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 16/728,515

(22) Filed: Dec. 27, 2019

(65) Prior Publication Data

US 2020/0377341 A1    Dec. 3, 2020

(30) Foreign Application Priority Data

Jun. 3, 2019  (EP) .................................... 19177871

(51) Int. Cl.
| | | |
|---|---|---|
| *B66B 23/10* | (2006.01) | |
| *B65G 21/20* | (2006.01) | |
| *B66B 21/10* | (2006.01) | |

(52) U.S. Cl.
CPC .............. *B66B 23/10* (2013.01); *B65G 21/20* (2013.01); *B66B 21/10* (2013.01); *B65G 2207/48* (2013.01)

(58) Field of Classification Search
CPC ......... B66B 23/10; B66B 23/12; B66B 21/10; B66B 23/026; B65G 21/20; B65G 2207/48
USPC ........................................ 198/321, 326, 333
See application file for complete search history.

(56) References Cited

U.S. PATENT DOCUMENTS

| | | | | | |
|---|---|---|---|---|---|
| 5,072,821 | A | * | 12/1991 | Kruse ..................... | F16C 33/04 198/327 |
| 5,697,487 | A | * | 12/1997 | Engelke ................. | B66B 23/10 198/326 |
| 5,894,917 | A | * | 4/1999 | Kwon ..................... | B66B 23/12 198/333 |
| 6,085,891 | A | | 7/2000 | Behle | |
| 7,407,049 | B2 | * | 8/2008 | Aulanko ................. | B66B 23/12 198/333 |
| 7,410,043 | B2 | * | 8/2008 | Aulanko ................. | B66B 23/10 198/333 |
| 10,160,621 | B2 | * | 12/2018 | Turek ..................... | B66B 21/10 |
| 2016/0221798 | A1 | * | 8/2016 | Eidler .................... | B66B 21/10 |

(Continued)

FOREIGN PATENT DOCUMENTS

| | | |
|---|---|---|
| EP | 0490591 A2 | 6/1992 |
| EP | 0771756 A2 | 5/1997 |

(Continued)

OTHER PUBLICATIONS

European Search Report for application EP 19177871.1, dated Nov. 28, 2019, 8 pages.

*Primary Examiner* — James R Bidwell
(74) *Attorney, Agent, or Firm* — Cantor Colburn LLP (57) ABSTRACT

A conveyance element (20) for a conveyor (1), in particular for a people conveyor such as a moving walkway (2), is configured for being moved in a conveying direction and comprises a body (30) including or supporting a tread plate (28) for supporting passengers; and at least one slider bracket (40) mounted to the body (30). The at least one slider bracket (40) comprises a slider slot (41) configured for slidably accommodating a slider (42).

14 Claims, 10 Drawing Sheets (56) References Cited

U.S. PATENT DOCUMENTS

2016/0355379 A1* 12/2016 Matheisl ................ B66B 21/02
2017/0197809 A1*  7/2017 Matheisl ............... B66B 29/005

FOREIGN PATENT DOCUMENTS

| JP | 4-72289 | * | 2/1990 | ............. B65G 23/12 |
| WO | 2015058909 A1 | | 4/2015 | |
| WO | 2015113680 A1 | | 8/2015 | |

* cited by examiner

CONVEYANCE ELEMENT FOR A CONVEYOR

FOREIGN PRIORITY

This application claims priority to European Patent Application No. 19177871, filed Jun. 3, 2019, and all the benefits accruing therefrom under 35 U.S.C. § 119, the contents of which in its entirety are herein incorporated by reference.

BACKGROUND

The invention relates to a conveyance element for a conveyor, in particular for a people conveyor such as a moving walkway. The invention also relates to a conveyor comprising such a conveyance element, and to a method of manufacturing such conveyance elements.

A (people) conveyor, such as a moving walkway, usually comprises a plurality of conveyance elements, e.g. pallets, forming an endless conveyance band extending in a closed loop between two opposing turnaround portions.

It would be beneficial to facilitate the manufacturing of the conveyance elements in order to reduce the costs of the conveyor.

SUMMARY

According to an exemplary embodiment of the invention a conveyance element for a (people) conveyor, such as a moving walkway, is configured for being moved in a conveying direction and comprises a body including or supporting a tread plate. The tread plate is configured for supporting the load and/or passengers. The conveyance element further comprises at least one slider bracket, which is manufactured separately from the body and then mounted to the body. A slider slot, which is configured for slidably accommodating a slider, is formed within the slider bracket.

Exemplary embodiments of the invention further comprise a (people) conveyor, such as a moving walkway, comprising a plurality of conveyance elements according to an exemplary embodiment of the invention, and a tension element, in particular a conveying chain or a conveying belt, connected to the conveyance elements and configured for driving the conveyance elements.

Exemplary embodiments of the invention also comprise a method of manufacturing conveyance elements for a (people) conveyor, such as a moving walkway, wherein the method comprises forming an extrusion profile by extruding a material through a die; cutting the extrusion profile into a plurality of pieces, each of the pieces constituting a slider bracket; and mounting the slider brackets to the bodies of conveyance elements.

Manufacturing the slider brackets separately from the bodies of the conveyance elements facilitates the manufacturing of the slider brackets. As a result, the conveyance elements may be produced at lower costs. If necessary, slider brackets according to exemplary embodiments of the invention may be replaced without replacing the complete conveyance elements.

Slider brackets according to exemplary embodiments of the invention may be manufactured at low costs by extruding an appropriate material through an appropriate die. Slider brackets having different widths may be cut from the same piece of extruded material (extrusion profile). This allows reducing the manufacturing costs even further. After the slider brackets have been cut from the piece of extruded material, no further machining, such as milling or drilling, is necessary.

Very robust slider brackets having a long lifetime may be formed. Further, the design of the slider brackets may be adapted easily to the respective needs in different applications.

A number of optional features are set out in the following. These features may be realized in particular embodiments, alone or in combination with any of the other features.

The slider bracket may be an extrusion profile, i.e. a profile made by extruding an appropriate material, such as steel, aluminum or a synthetic material, in particular a fiber reinforced synthetic material, through a die.

The slider bracket may be mounted to the body by at least one fixing bolt, screw and/or nut providing a mechanically strong connection, but allowing replacement of the slider bracket by debonding said connection.

The slider slot may have a rectangular cross-section providing a well defined movement path for the slider.

The slider bracket may comprise a protrusion which is configured to be received in a corresponding opening formed within the body in order to ensure a correct alignment of the slider bracket with respect to the body.

The body may comprise at least one metal sheet, in particular two metal sheets attached to each other. The at least one metal sheet may be bent into the desired shape. The at least two metal sheets may be attached to each other by means of bolts, screws, soldering, welding and/or an appropriate adhesive material. The at least one metal sheet may be made of steel or aluminum.

The body also may comprise an extrusion profile, in particular an extrusion profile made of metal, such as aluminum or steel, in particular stainless steel, or an appropriate synthetic material, in particular a fiber reinforced synthetic material.

The body in particular may be an extrusion profile with a cross-section having a closed shape.

A portion of the body opposite to the tread plate may be a concave portion, i.e. a portion having a concave shape along the conveying direction. Providing such a concave portion at the body allows reducing the dimensions of the turnaround portions by arranging the conveyance elements closer to the turnaround sheaves guiding the conveyance elements in the turnaround portions.

The conveyance element may comprise at least one roller support mounted to the body, the roller support in particular may be mounted to a side of the conveyance element opposite to the slider bracket when viewed in the conveying direction. The at least one roller support may support at least one roller configured for guiding the conveyance element along at least one guide rail. The at least one roller may be arranged on an axle supported by the roller support. Said axle may be used for connecting adjacent conveyance elements which each other, thereby forming the conveyance band of the conveyor.

The conveyance element may comprise at least two slider brackets spaced apart from each other in a direction transverse to the conveying direction. This provides a symmetric configuration resulting in a symmetric distribution of the forces acting on the conveyance element.

At least one slider may be arranged in the slider slot of the at least one slider bracket. The slider in particular may be configured for accommodating the axle of an adjacent conveyance element thereby linking two adjacent conveyance elements with each other.

Exemplary embodiments of the invention include a combination of two conveyance elements according to exemplary embodiments of the invention and at least one axle. The at least one axle may extend through the at least one slider arranged in the at least one slider bracket of a first of the two conveyance elements and through at least one roller support mounted to the body of a second of the two conveyance elements thereby joining the two conveyance elements with each other.

The at least one axle may be rotatably mounted to a tension element of the conveyor, which is configured for driving the conveyance elements.

The combination may further comprise at least one roller supported by the at least one axle. The at least one roller may be configured for supporting and guiding the conveyance elements along guide rails of the conveyor defining the movement path of the conveyance band.

DRAWING DESCRIPTION

In the following exemplary embodiments of the invention are described with reference to the enclosed figures.

DETAILED DESCRIPTION

Figure 1:
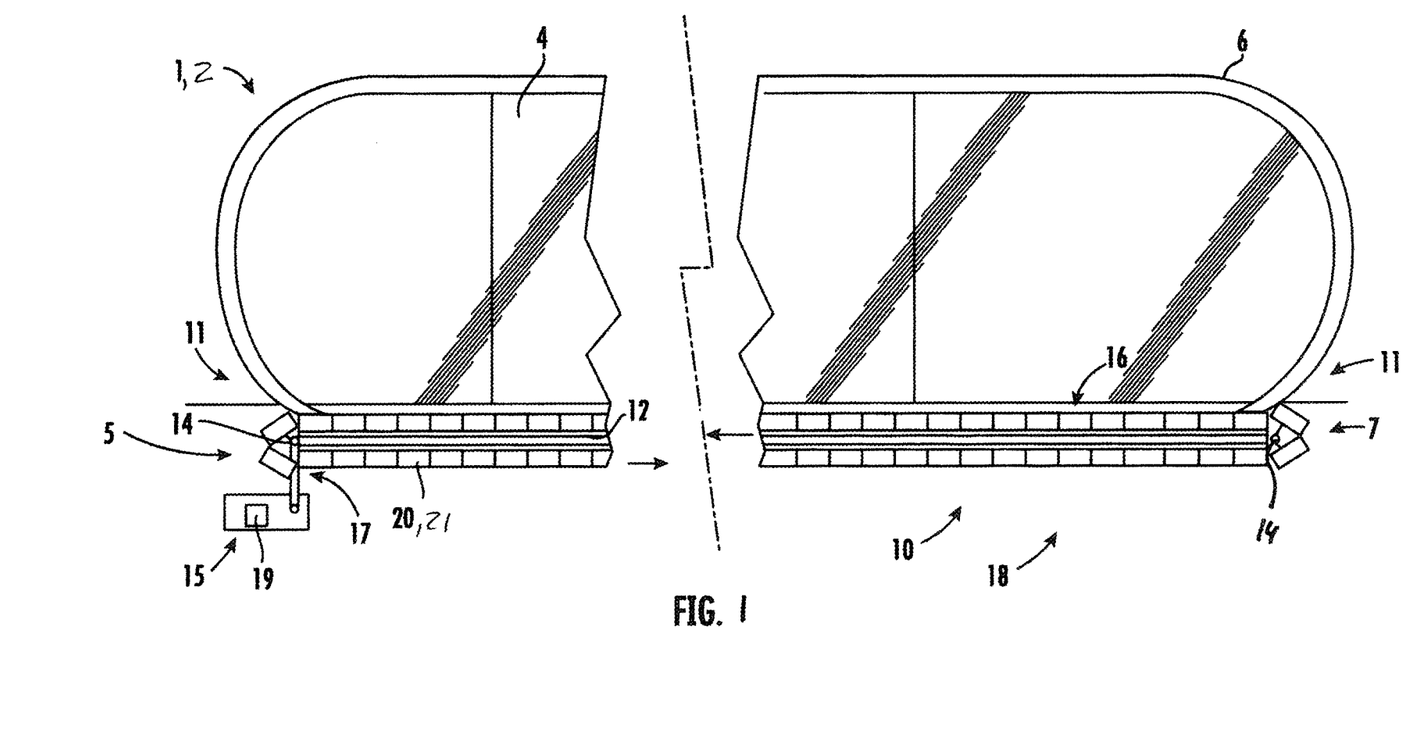
FIG. 1 depicts a schematic side view of a conveyor, in particular of a people conveyor such as a moving walkway.

FIG. 1 depicts a schematic side view of a conveyor 1, in particular a people conveyor such as a moving walkway 2.

The conveyor 1 comprises an endless conveyance band 10 including conveyance elements 20, in particular pallets 21, moving between two landing portions 11 provided at opposite ends of the conveyor 1. The conveyance elements 20 move along a conveyance direction in an upper conveyance portion 16 and opposite to the conveyance direction in a lower return portion 18. Turnaround portions 5, 7, are provided at both ends of the conveyor 1 next to the landing portions 11. In one of the turnaround portions 5, 7, the conveyance elements 20 pass from the conveyance portion 16 into the return portion 18. In the other one of the turnaround portions 5, 7, the conveyance elements 20 pass from the return portion 18 into the conveyance portion 16.

The conveyance elements 20 are connected to a tension element 12, such as a drive chain or belt, extending along a closed loop and configured for driving the conveyance elements 20. The tension element 12 extends around and is driven by at least one sprocket or sheave 14. A drive 15 including a motor 19 is provided for driving the sprocket or sheave 14 via a transmission element 17, e.g. a transmission belt or a transmission chain.

Balustrades 4 supporting moving handrails 6 extend parallel to the conveyance portion 16.

Figure 2:
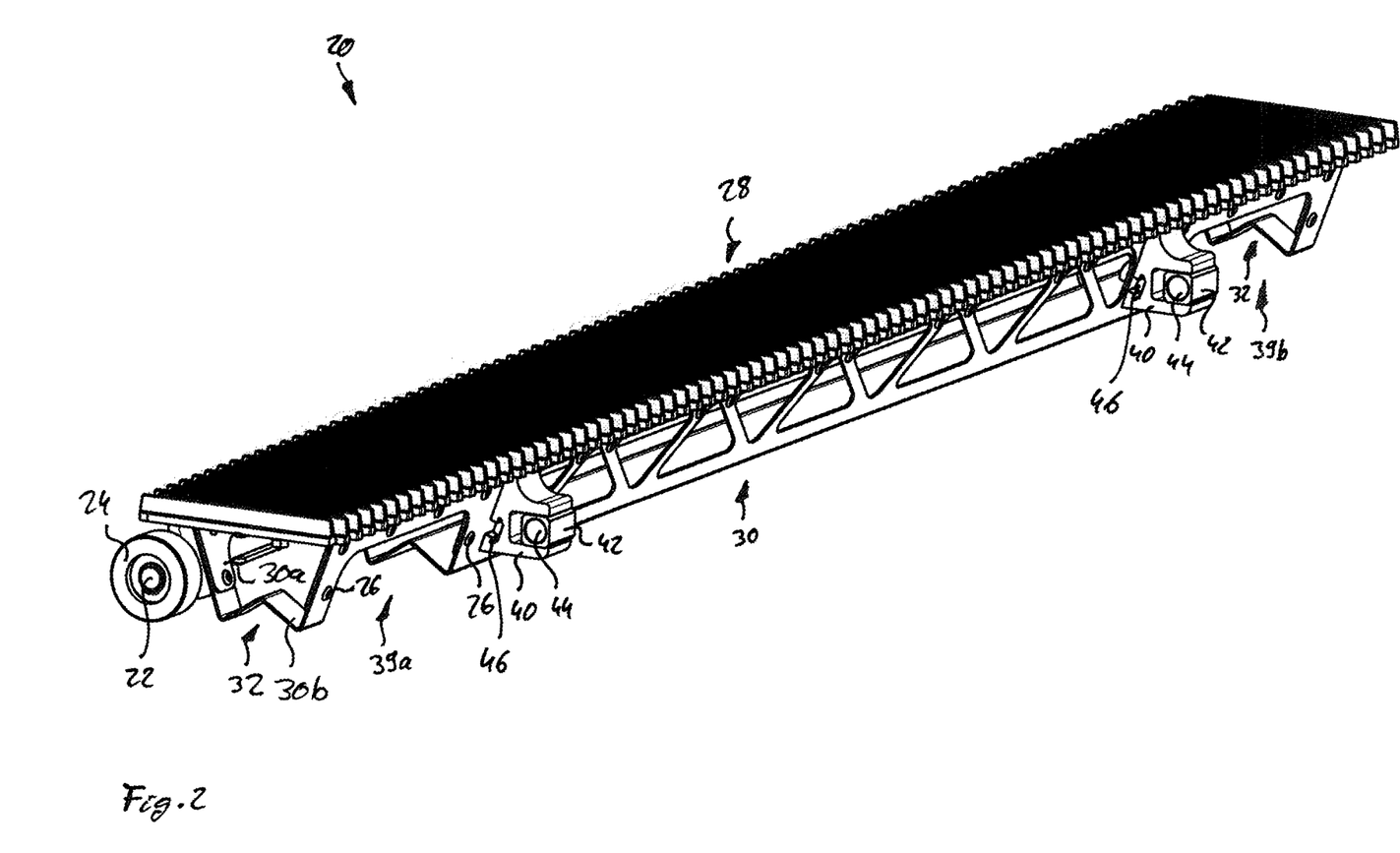
FIG. 2 depicts a perspective view of a conveyance element according to an exemplary embodiment of the invention.
Figure 3:
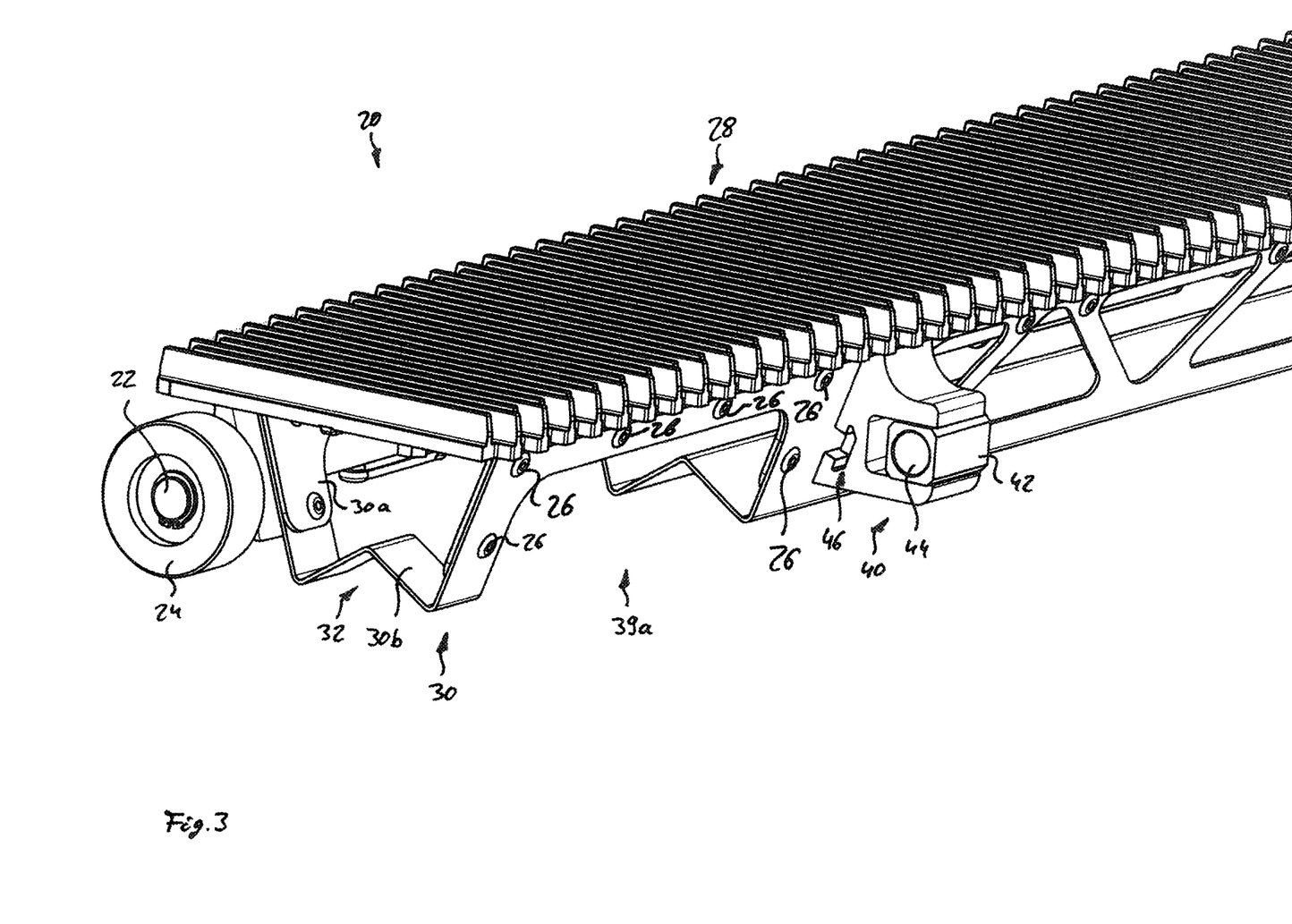
FIG. 3 depicts an enlarged partial view of the conveyance element depicted in FIG. 2.
Figure 4:
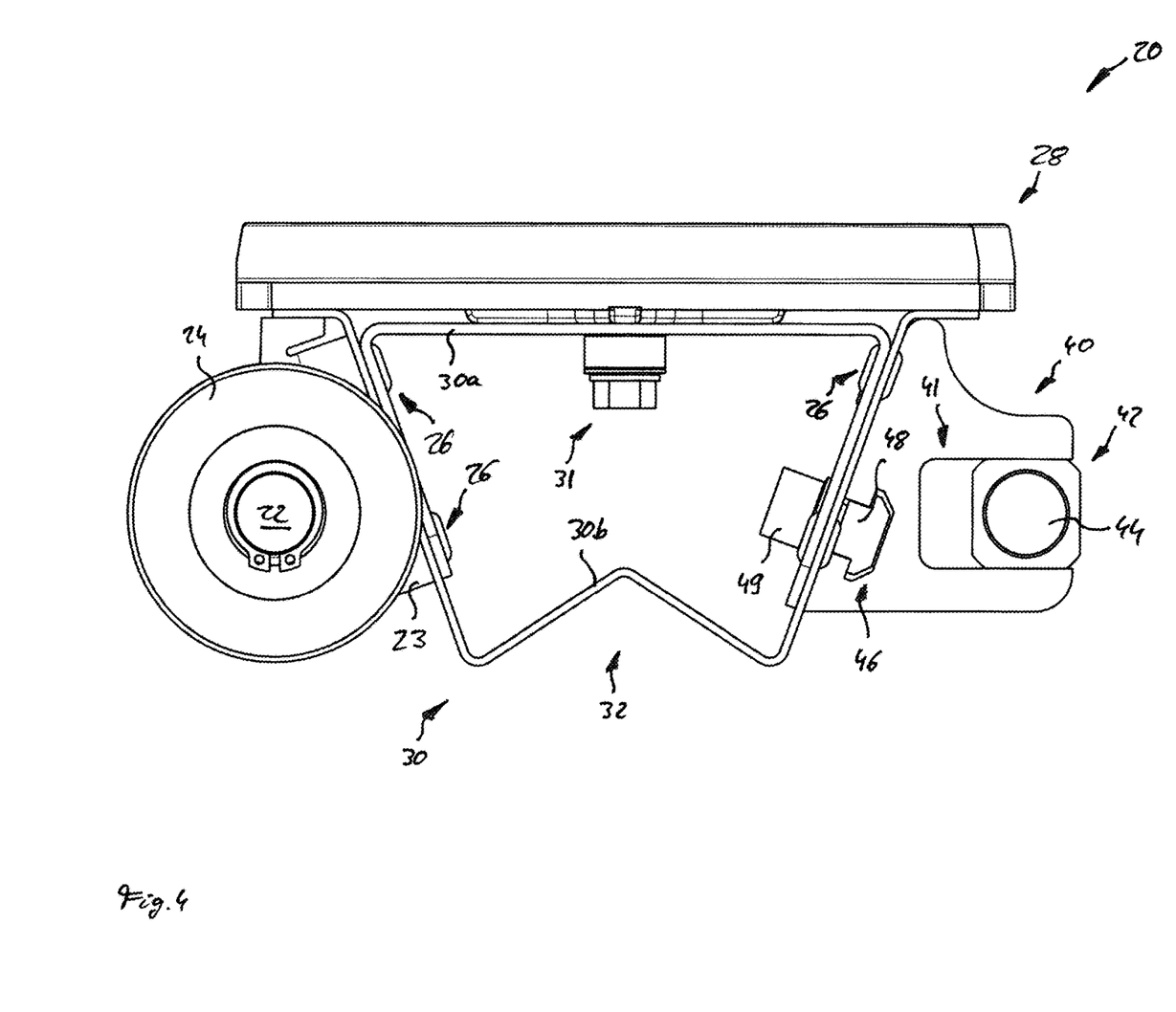
FIG. 4 depicts a side view of the conveyance element depicted in FIGS. 2 and 3.
Figure 5:
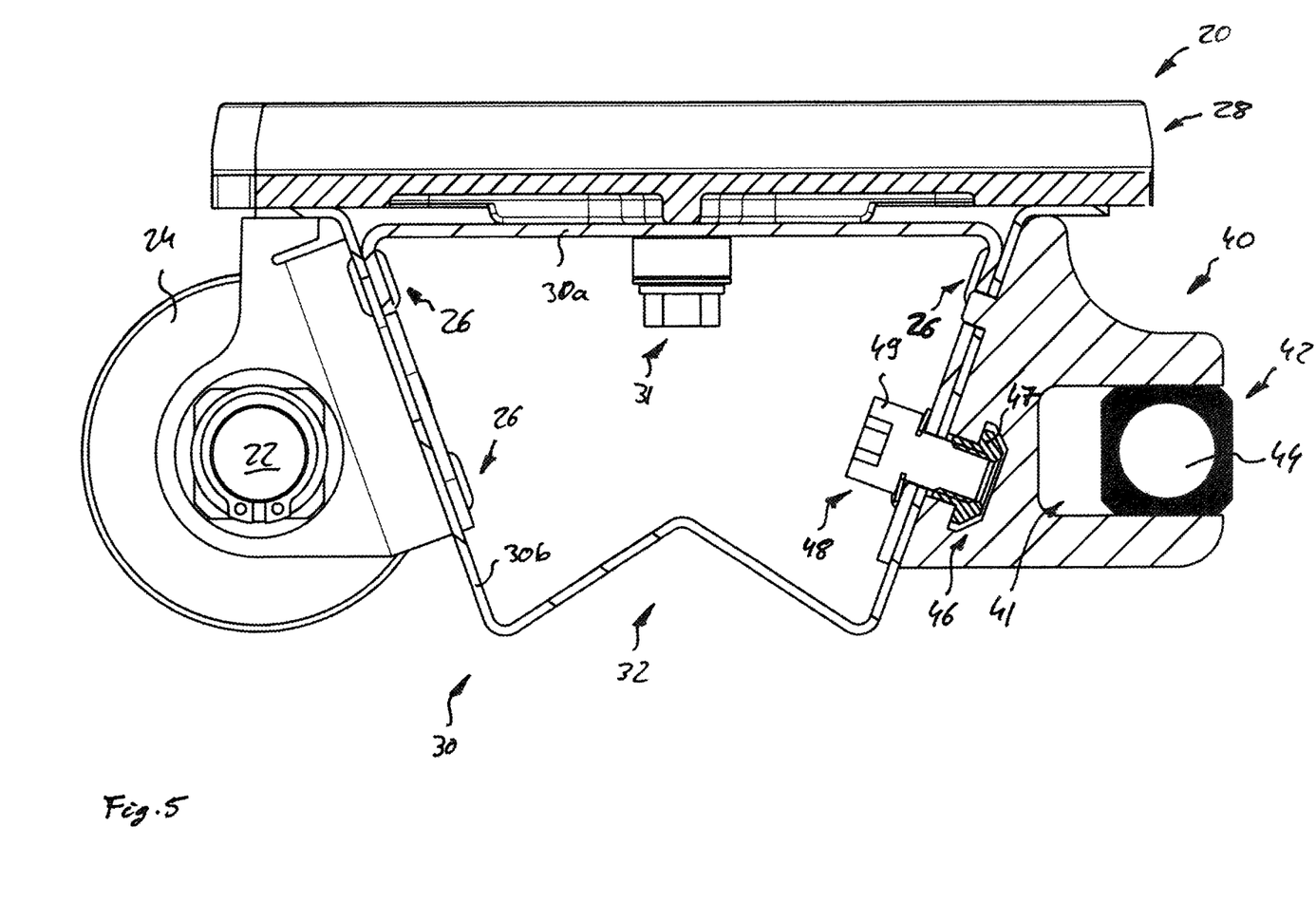
FIG. 5 shows a sectional view of the conveyance element depicted in FIGS. 2 to 4.

FIG. 2 depicts a perspective view of a conveyance element 20 according to an exemplary embodiment of the invention. FIG. 3 depicts an enlarged partial view, and FIG. 4 depicts a side view of the conveyance element 20 depicted in FIG. 2, and FIG. 5 shows a sectional view thereof.

The conveyance element 20 comprises a body 30 supporting a tread plate 28. In the embodiment depicted in the figures, the tread plate 28 is produced separately from the body 30 and attached to the body 30 by means of tread plate fixing elements 31, such as bolts or screws. Only one fixing element 31 is visible in FIGS. 4 and 5, respectively.

In further embodiments, which are not explicitly shown in the figures, the tread plate 28 may be formed integrally with the body 30.

In the embodiment depicted in FIGS. 2 to 5, the body comprises two sheets 30a, 30b, in particular bent metal sheets 30a, 30b, which are attached to each other by a plurality of body fixing elements 26, such as bolts or screws. Alternatively or additionally to the body fixing elements 26, other fixing methods, such as adhesive bonding/gluing, welding or soldering, may be employed.

As visible in FIGS. 2 and 3, the metal sheets 30a, 30b have a grid-like structure comprising holes for reducing the weight of the body 30 without deteriorating its mechanical rigidity and strength.

In further embodiments, which are not explicitly show in the figures, the body 30 may be formed integrally, i.e. as a single piece, e.g. as an extrusion profile.

The body 30 may be made of steel or a material comprising steel, and the tread plate 28 may be made of aluminum or a material comprising aluminum. The body 30 and the tread plate 28 also may be made of the same material, which may include steel and/or aluminum.

Alternatively, the body 30 and/or the tread plate 28 may be made of a synthetic material, in particular a fiber reinforced synthetic material.

A concave recess 32 is formed in the side of the body 30 opposite to the tread plate 28. Providing such a recess 32 allows positioning the conveyance element 20 closer to the sheaves 14, thereby reducing the dimensions of the turnaround portions 5, 7 of the conveyor 1. This, feature, however, is not an essential feature of the present invention. Thus, although not explicitly shown in the figures, exemplary embodiments of the invention also include configurations without such a recess 32.

Roller supports 23 respectively supporting an axle 22 with at least one roller 24 are mounted to one side of the body 30. Although only one roller support 23 and one roller 24 are visible in FIGS. 2 to 5, respectively, the skilled person understands that the conveyance elements 20 usually will be equipped with at least two rollers 24, one roller 24 arranged at each lateral side of the conveyance element 20, respectively.

A single axle 22 may extend over the whole width of the conveyance element 20 supporting all rollers 24 of the respective conveyance element 20. Alternatively, separate axles 22 may be provided at each lateral side of the conveyance element 20, respectively.

The rollers 24 are supported and guided by guide rails (not shown), defining the moving path of the conveyance elements 20.

Slider brackets 40 are attached to the side of the body 30 opposite to the roller supports 23. Each slider bracket 40 is fixed to the body 30 by a fixing bolt 48 extending into a fixing bolt cavity 46 ("fixing bolt cut-out") formed within the respective slider bracket 40.

The fixing bolt 48 is accommodated within the fixing bolt cavity 46 in an undercut configuration resulting in a strong but separable mechanical connection between the body 30 and the slider bracket 40.

The fixing bolt 48 may include a threaded bolt 49, which is fixed within the fixing bolt cavity 46 by means of a threaded nut 47 screwed onto the threaded bolt 49.

An inverse configuration (not shown), in which a head of the threaded bolt 49 is a arranged within the fixing bolt cavity 46 and the threaded nut 47 is located within the body 30 of the conveyance element 20 is possible as well.

A slider slot 41 is formed within the slider bracket 40. In the configuration depicted in the figures, the slider slot 41 extends basically parallel to the tread plate 28, i.e. basically parallel to the conveyance direction of the conveyance element 20.

A slider 42 is slideably accommodated within the slider slot 41 in a configuration allowing the slider 42 to move within the slider slot 41 parallel to the tread plate 28, i.e. basically parallel to the conveyance direction.

In the configuration depicted in the figures, the slider 42 has a basically quadratic cross-section (see in particular FIGS. 4 and 5). However, the cross-section may have other shapes, for example a rectangular shape, as well.

An opening 44 extending orthogonally to the conveyance direction, i.e. parallel to the lateral extension of the conveyance element 20, is formed within the slider 42.

The opening 44 has a circular cross-section and is configured for accommodating an axle 22 of an adjacent conveyance element 20, thereby linking two adjacent conveyance elements 20 with each other for forming the conveyance band 10.

Figure 6:
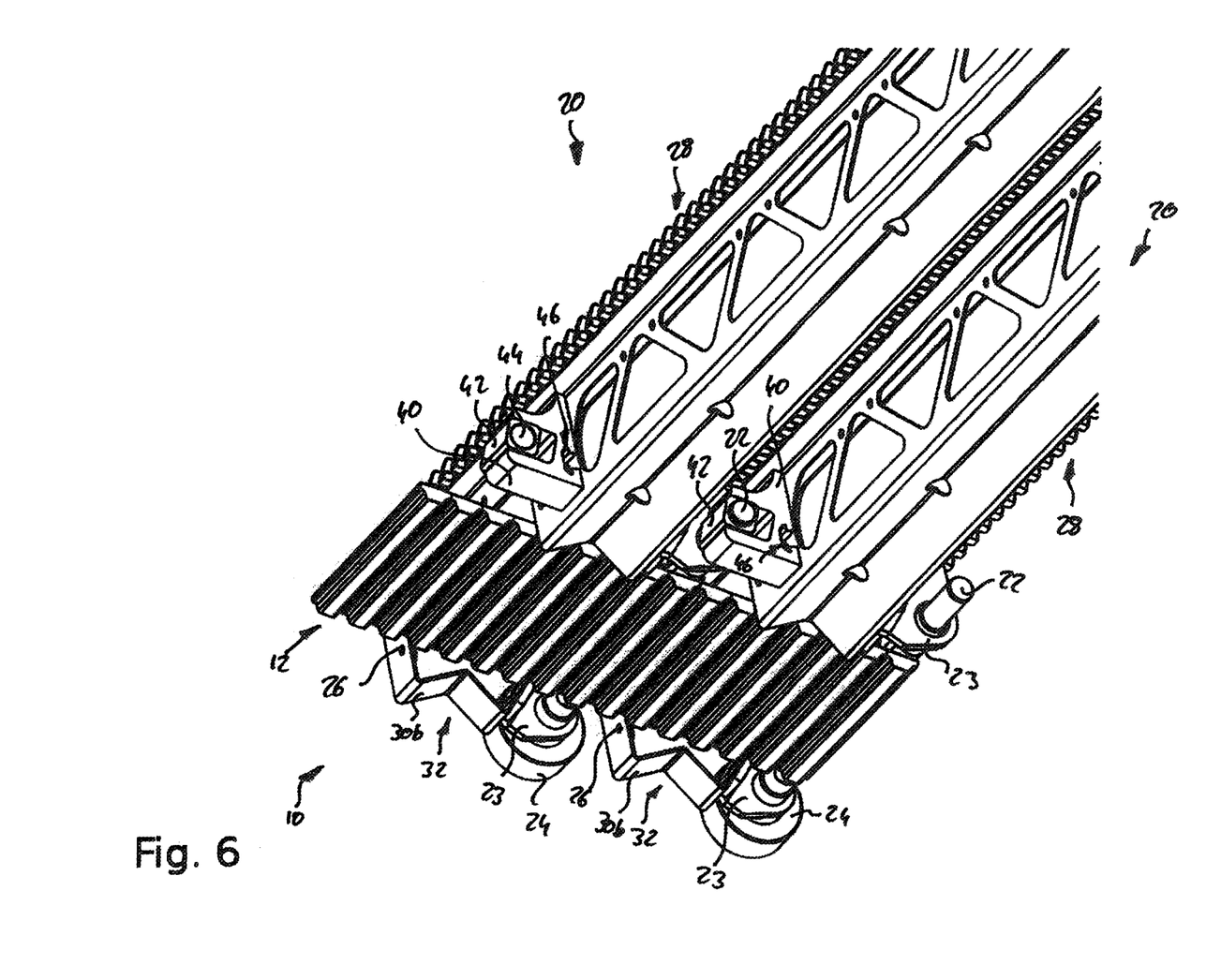
FIGS. 6 and 7 show perspective views of two adjacent conveyance elements according to an exemplary embodiment of the invention.
Figure 7:
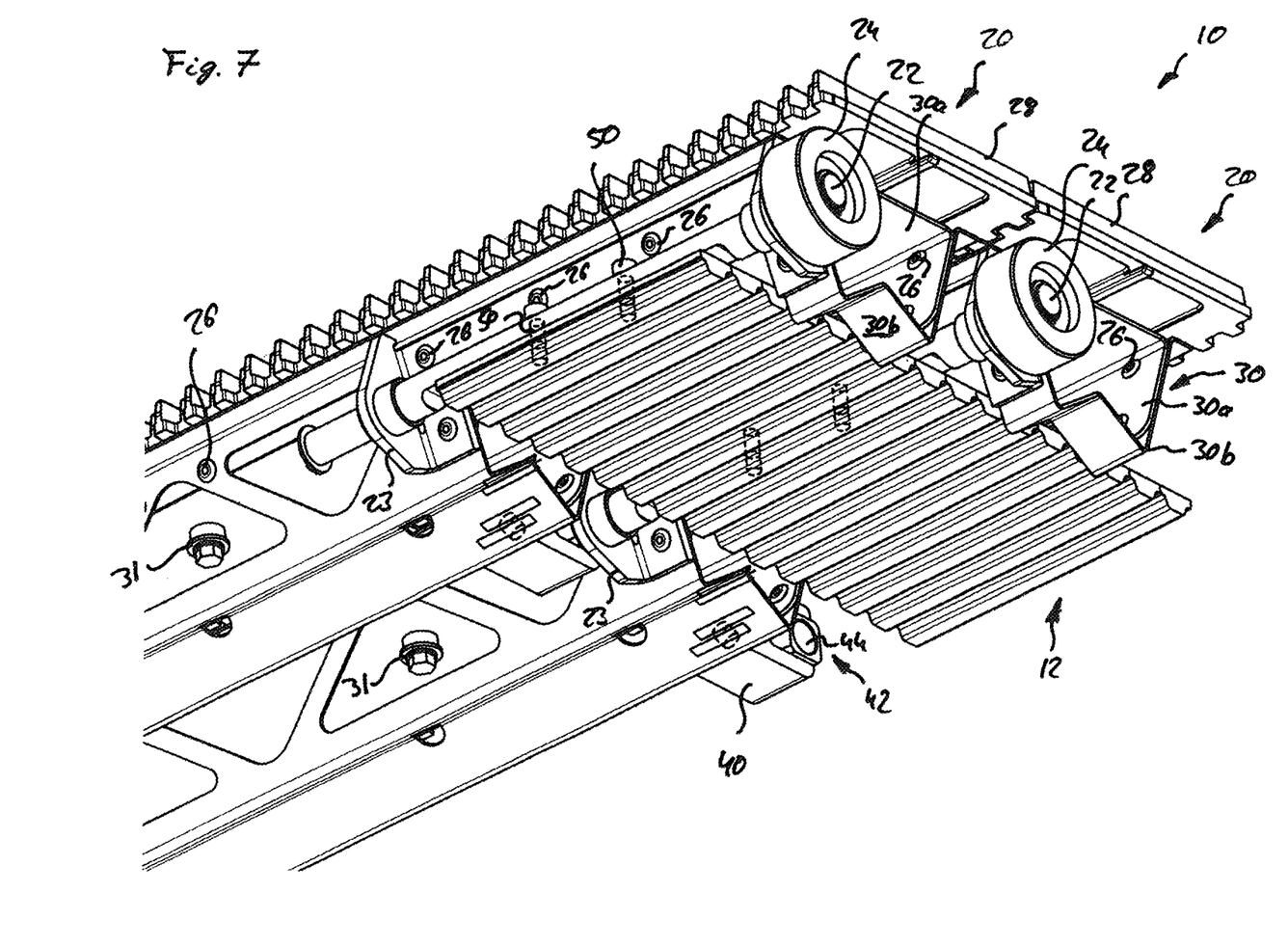

FIGS. 6 and 7 show perspective views of two adjacent conveyance elements 20 according to an exemplary embodiment of the invention, which are linked with each other as described before, thereby forming a portion of the conveyance band 10.

The axles 22 extending through the openings 44 formed within the sliders 42 are further attached to a tension element 12 of the conveyor 1 by means of appropriate attaching elements 50 (only shown in FIG. 7), thereby mechanically connecting the conveyance elements 20 with the tension elements 12. Typically, a conveyor 1 comprises two tension elements 12 extending parallel to each other.

The sliding motion of the slider 42 along the slider slot 41 allows varying the distance between two adjacent conveyance elements 20 in the conveyance direction, as it is necessary when guiding the conveyance elements 20 around the curved turnaround portions 5, 7.

Figure 8:
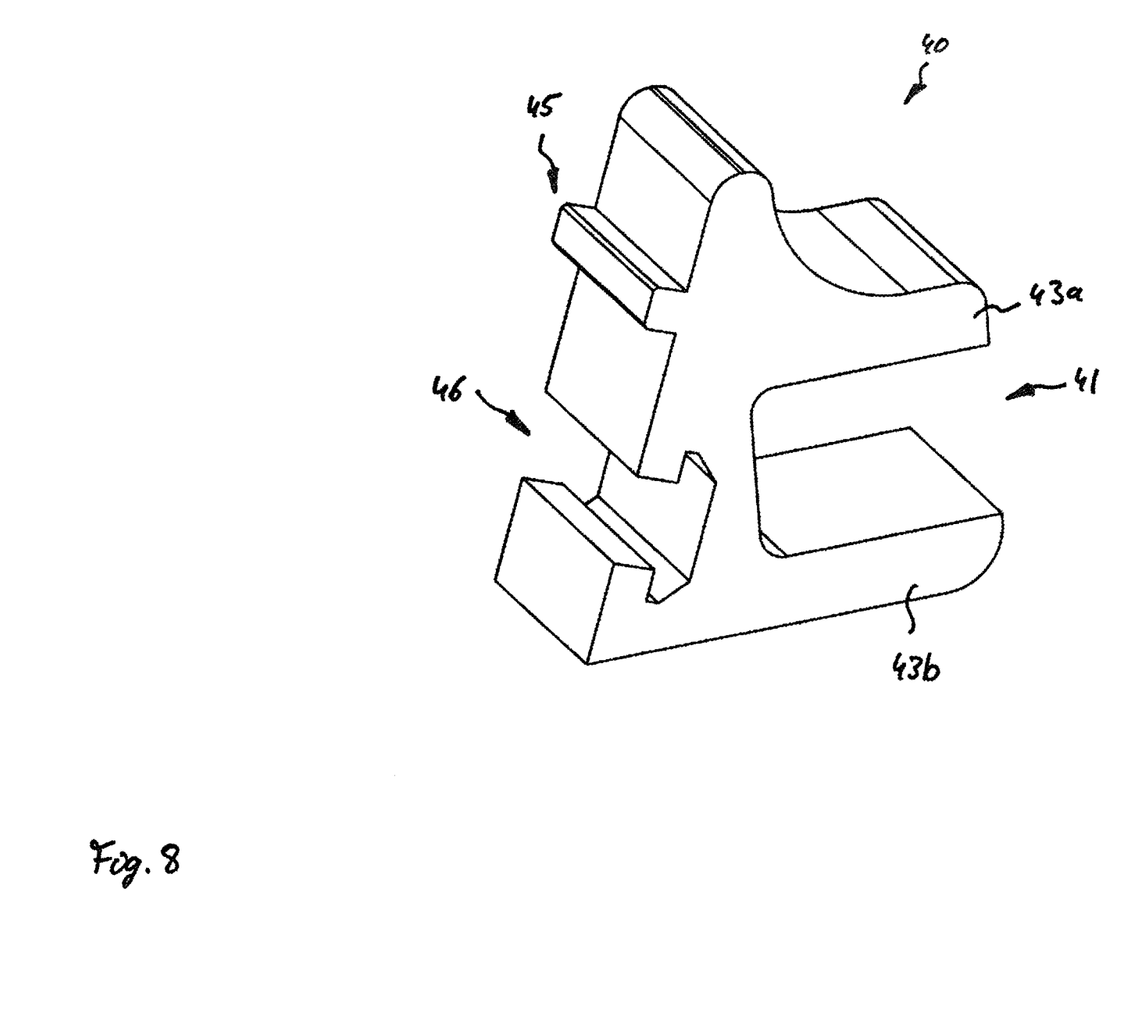
FIG. 8 depicts a perspective view of a slider bracket according to an exemplary embodiment of the invention.

FIG. 8 depicts a perspective view of a slider bracket 40 according to an exemplary embodiment of the invention comprising two legs 43a, 43b extending parallel to each other defining the slider slot 41 in between.

On the side opposite to the slider slot 41, a protrusion 45 is formed next to the fixing bolt cavity 46.

When the slider bracket 40 is correctly mounted to the body 30, the protrusion 45 extends through a corresponding opening formed within the body 30 (see FIG. 5), thereby securing that the slider bracket 40 is correctly aligned with respect to the body 30.

In the embodiment depicted in FIG. 8, the protrusion 45 is a horizontally extending bar. However, other shapes may be employed as well.

Figure 9:
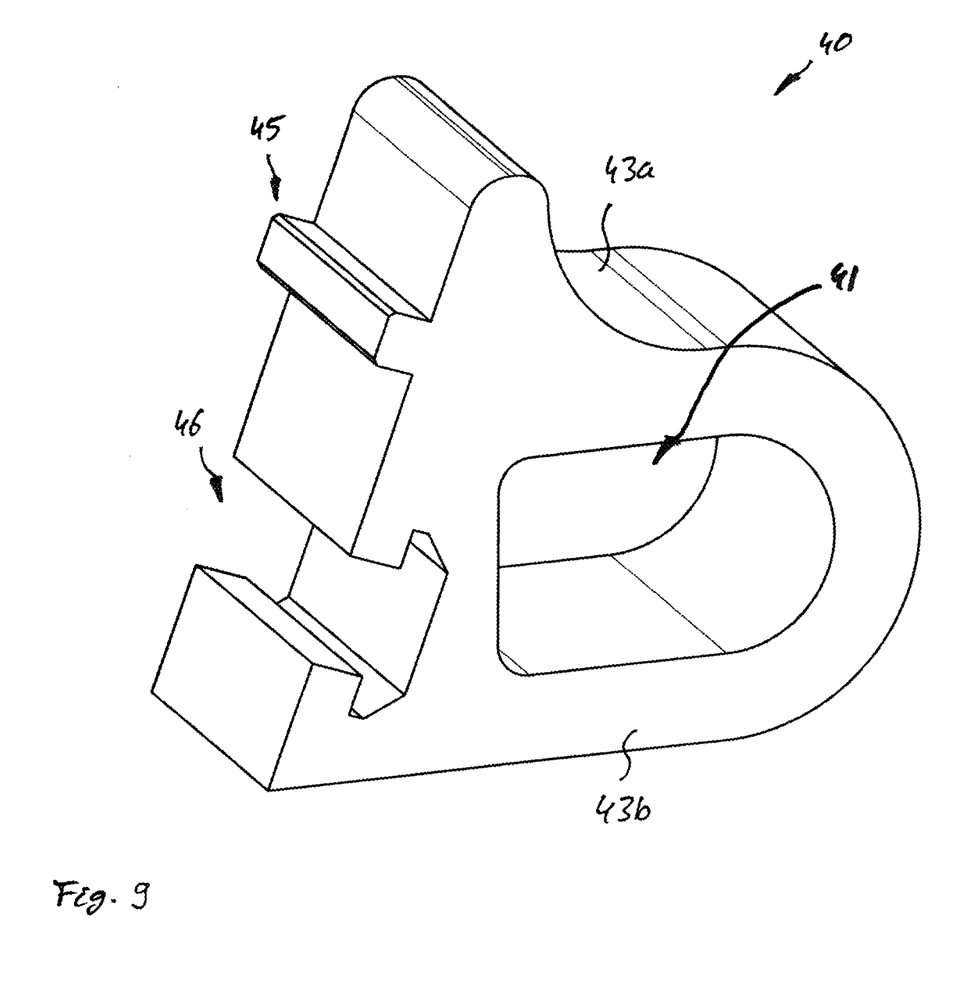
FIG. 9 depicts a perspective view of a slider bracket according to another exemplary embodiment of the invention.

The slider slot 41 of the slider brackets 40 depicted in FIGS. 1 to 8 is open at the end facing away from the body 30. This, however, is an optional feature. FIG. 9 depicts an alternative configuration of a slider bracket 40, in which the slider slot 41 is completely closed, Such a configuration prevents the slider 42 from accidentally sliding out of the slider slot 41 in the conveyance direction.

The slider bracket 40 may be an extrusion profile, i.e. an element manufactured by extruding an appropriate material through a die.

Figure 10:
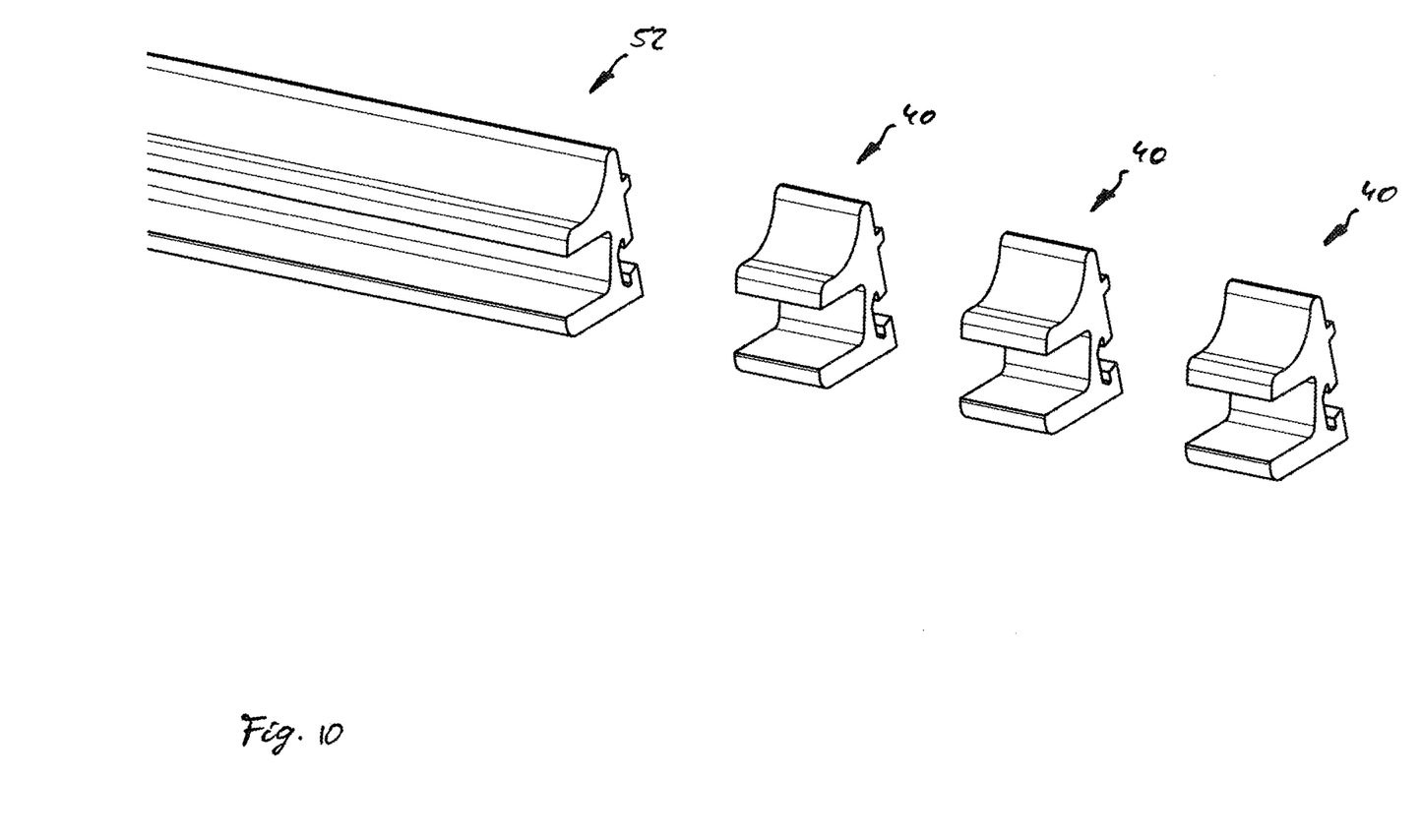
FIG. 10 depicts an extrusion profile and three slider brackets which have been formed from the extrusion profile.

FIG. 10 depicts a piece of extruded material (extrusion profile) 52. The cross-sectional shape of the extrusion profile corresponds with the cross-sectional shape of the slider brackets 40. FIG. 10 further shows three slider brackets 40 which have been formed by cutting slices having the desired width from the extrusion profile 52.

Depending on the width of the conveyance elements 20 and the kind of application, such as public or commercial, increasing the width of the slider brackets 40 may increase the area of contact between the slider brackets 40 and the bodies 30 of the conveyance elements 20. This will reduce the contact pressure and increase the lifetime of the components, in particular of the sliders 42.

After the slider brackets 40 have been cut from the piece of extruded material, no further machining, such as milling or drilling, is necessary. The legs 43a, 43b defining the slider slot 41 are very robust resulting in a long lifetime of the slider brackets 40. The slider brackets 40 may be replaced without replacing the complete conveyance element 20, if necessary, and their design may be adapted easily to the respective needs of different application.

The extrusion profile 52 and the slider brackets 40 may be made of an appropriate material providing the necessary mechanical strength, e.g. steel, aluminum or an appropriate synthetic material, in particular a fiber reinforced synthetic material.

Manufacturing the slider brackets 40 separately from the bodies 30 according to exemplary embodiments of the present invention allows facilitating the manufacturing of the slider brackets 40 and in consequence of the conveyance elements 20. It in particular allows optimizing the manufacturing process by using different manufacturing methods and/or materials for producing the slider brackets 40 and the bodies 30, respectively.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 conveyor
2 moving walkway
5 turnaround portions
7 turnaround portion
11 landing portion
12 tension element 14 sheave
15 drive
16 conveyance portion
17 transmission element
18 return portion
19 motor
20 conveyance element
21 pallet
22 axle
23 roller support
24 roller
26 fixing element
28 tread plate
30 body
30a, 30b sheets
31 fixing element
32 recess
40 slider bracket
41 slider slot
42 slider
43a, 43b legs
44 opening
45 protrusion
46 bolt cavity
47 threaded nut
48 fixing bolt
49 threaded bolt
50 attaching element
52 extrusion profile

What is claimed is:

1. A conveyance element for a conveyor, in particular for a people conveyor such as a moving walkway,
the conveyance element being configured for being moved in a conveying direction and comprising:
a body including or supporting a tread plate for supporting passengers; and
at least one slider bracket mounted to the body and comprising a slider slot configured for slidably accommodating a slider;
wherein the slider bracket is mounted to the body by at least one of a fixing bolt, a screw and a nut.

2. The conveyance element according to claim 1, wherein the slider bracket is an extrusion profile.

3. The conveyance element according to claim 1, wherein the slider bracket is made of aluminum or a synthetic material.

4. The conveyance element according to claim 1, wherein the slider slot has a rectangular cross-section.

5. The conveyance element according to claim 1, wherein the slider bracket comprises a protrusion configured to be received within a corresponding opening formed within the body.

6. The conveyance element according to claim 1, wherein the body comprises at least one metal sheet.

7. The conveyance element according to claim 1, wherein the body comprises an extrusion profile.

8. The conveyance element according to claim 1, wherein the body is made of steel, in particular stainless steel, or a synthetic material.

9. The conveyance element according to claim 1 comprising at least two slider brackets spaced apart from each other in a direction transverse to the conveying direction.

10. A combination of two conveyance elements according to claim 9 and an axle extending through the at least one slider arranged in the at least one slider bracket of a first of the two conveyances elements and through at least one roller support mounted to the body of a second of the two conveyance elements.

11. The combination of two conveyance elements according to claim 10, wherein the axle is rotatably mounted to a tension element which is configured for driving the conveyance elements.

12. The combination of two conveyance elements according to claim 10, further comprising at least one roller supported by the axle.

13. Conveyor, in particular a people conveyor such as a moving walkway, comprising a plurality of conveyance elements according to claim 1 and a tension element, in particular a conveying chain or a conveying belt, connected with the conveyance elements and configured for driving the conveyance elements.

14. Method of manufacturing conveyance elements for a conveyor, in particular people conveyor such as a moving walkway, wherein the method comprises:
forming an extrusion profile by extruding a material;
cutting the extrusion profile into a plurality of pieces, each of the pieces constituting a slider bracket; and
mounting the slider brackets to bodies of conveyance elements;
wherein the slider brackets are mounted to the bodies of conveyance elements by at least one of a fixing bolt, a screw and a nut.

* * * * *